Feb. 14, 1928.

O. W. CURTIS 1,659,462

MILLING MACHINE

Filed June 5, 1926

5 Sheets-Sheet 3

Feb. 14, 1928.

O. W. CURTIS 1,659,462

MILLING MACHINE

Filed June 5, 1926    5 Sheets-Sheet 4

Inventor
Oliver W. Curtis.
By Harry D. Wallace.
Attorney.

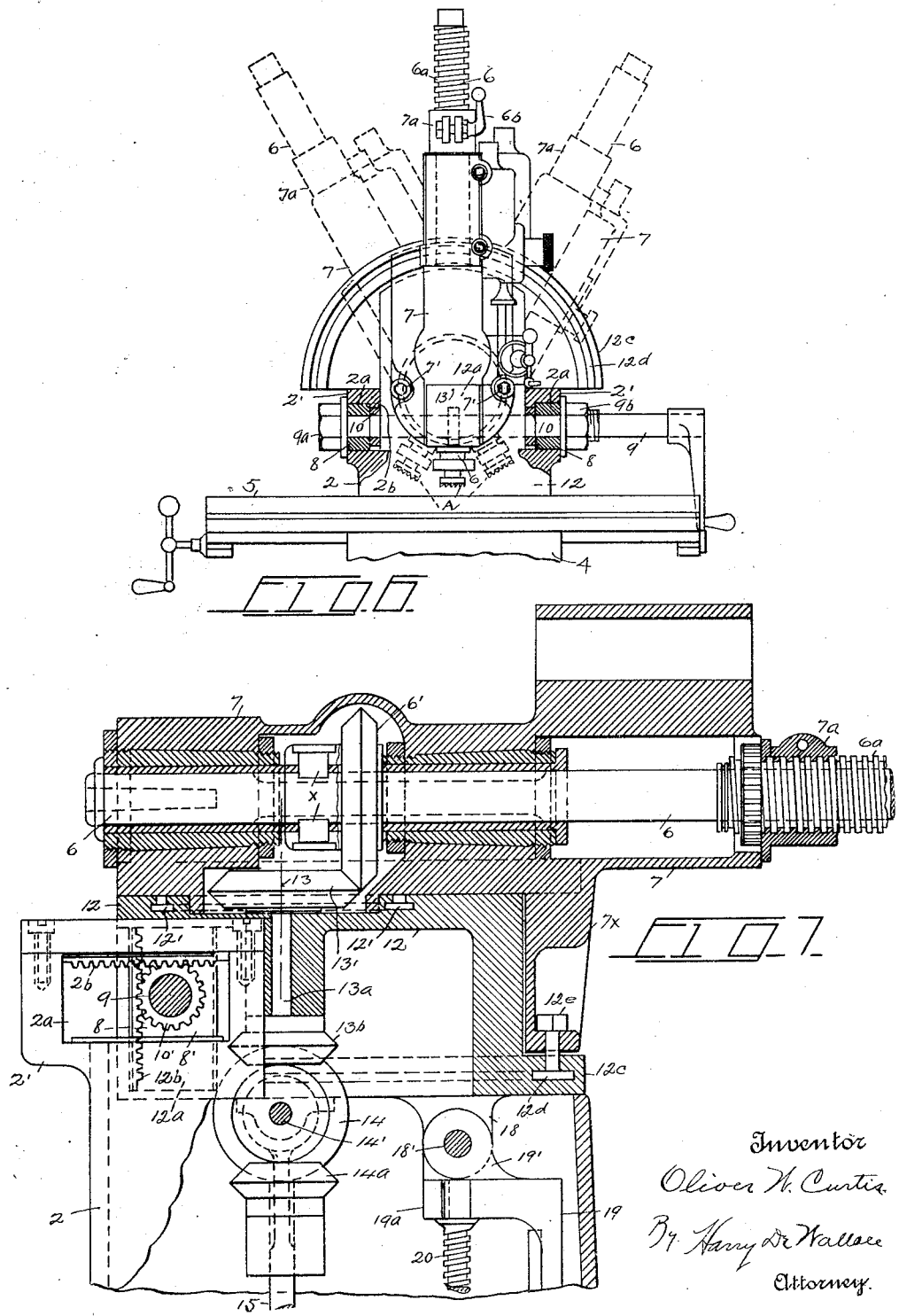

Patented Feb. 14, 1928.

1,659,462

UNITED STATES PATENT OFFICE.

OLIVER W. CURTIS, OF WATERTOWN, NEW YORK.

MILLING MACHINE.

Application filed June 5, 1926. Serial No. 113,954.

This invention relates to improvements in milling machines, and has for its object to provide novel construction and arrangement of the tool-spindle support, whereby the spindle may be tilted and operatively held at different angles relatively to the work-supporting table, and whereby the spindle support may be moved in opposite directions in a plane at right angles to the plane in which the support is tilted. A further object is to provide novel and simple means for adjusting the spindle support bodily horizontally, as well as vertically, whether or not the said support is in the normal or tilted position. A further object is to provide a novel driving mechanism which enables the spindle support to be rotated, tilted and moved bodily in different directions without interruption or requiring alteration or change of the driving means. And a further object is to generally improve, simplify and cheapen the construction and operation of milling machines of the universal type.

I attain these objects by the means set forth in the detailed description which follows, and as illustrated by the accompanying drawings, in which—

Figure 1:
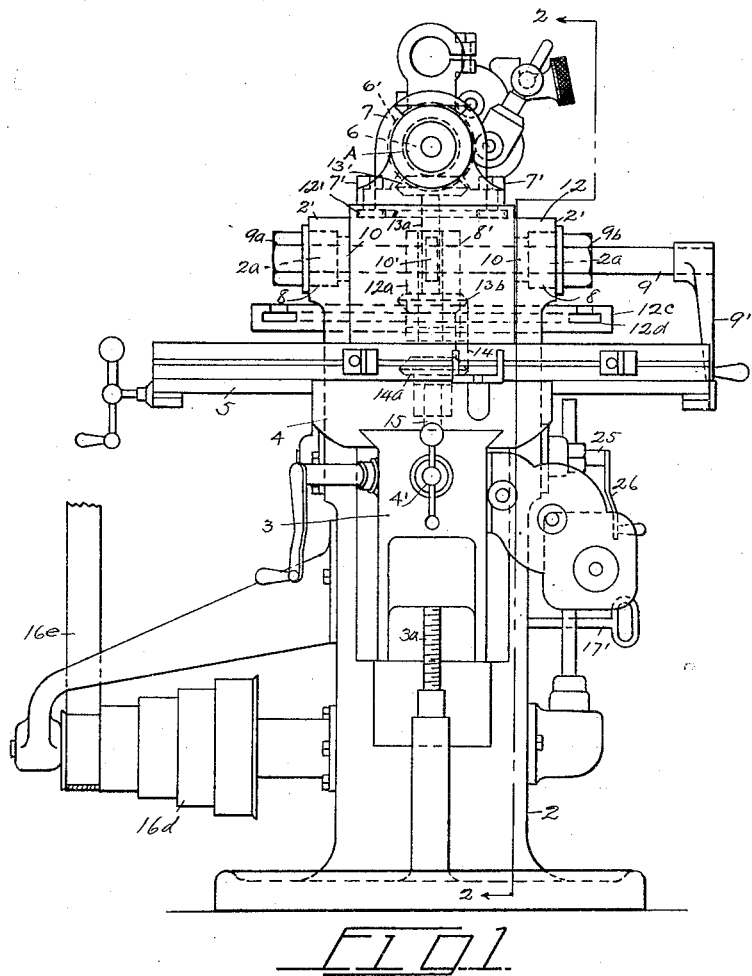
Figure 2:
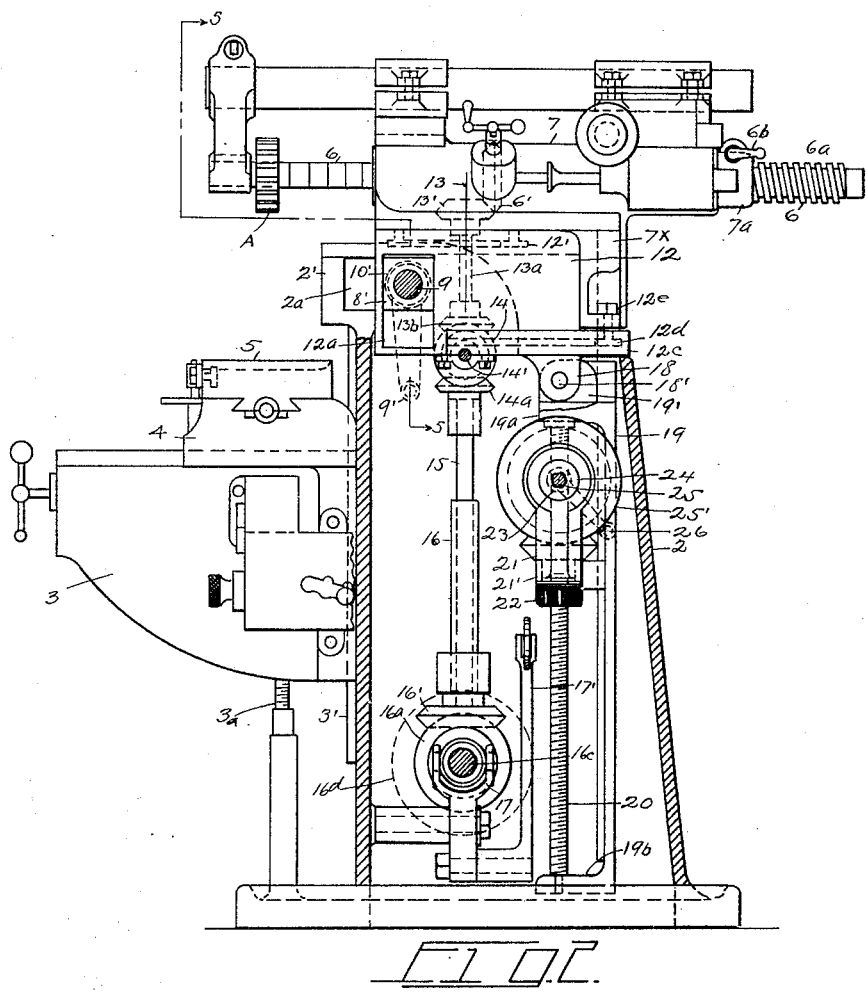
Figure 3:
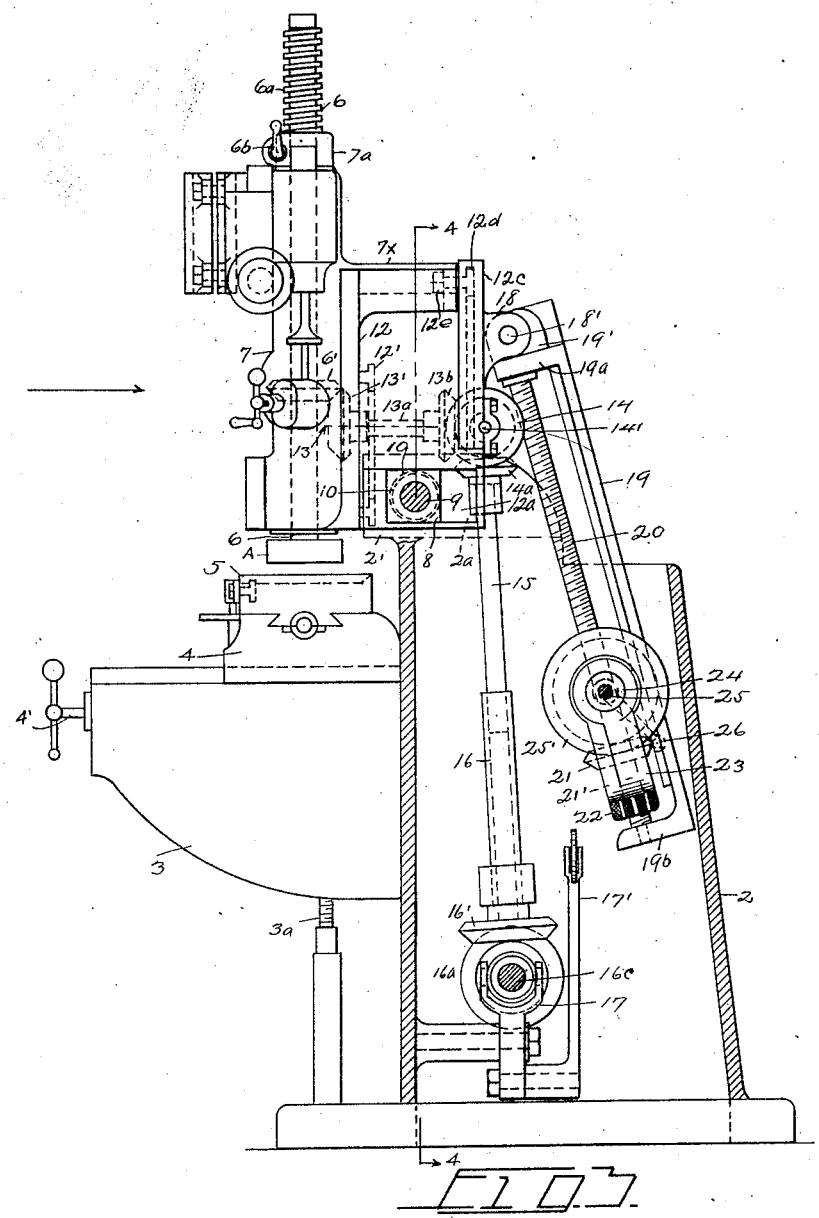
Figure 4:
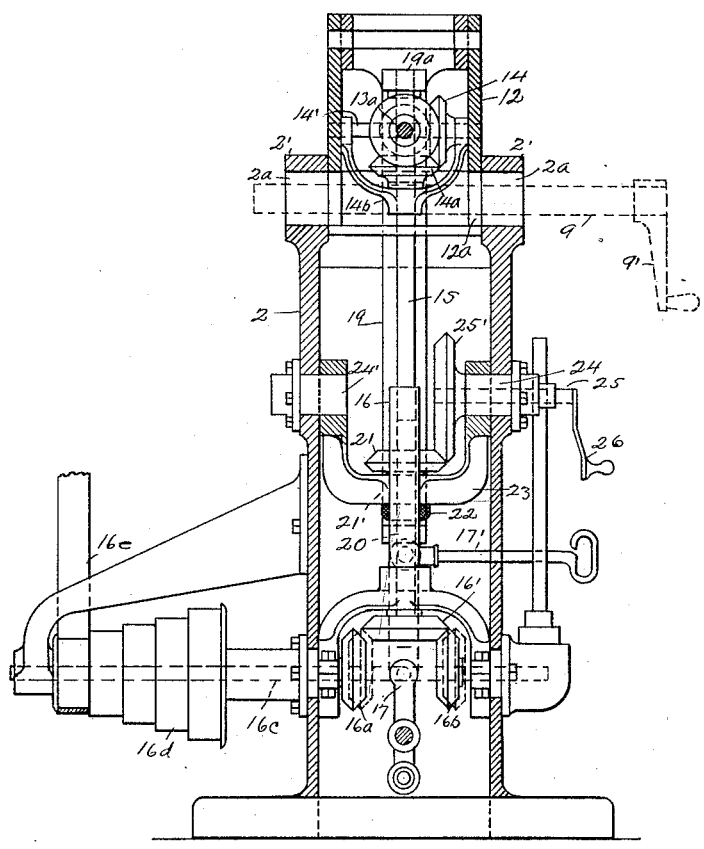
Figure 5:
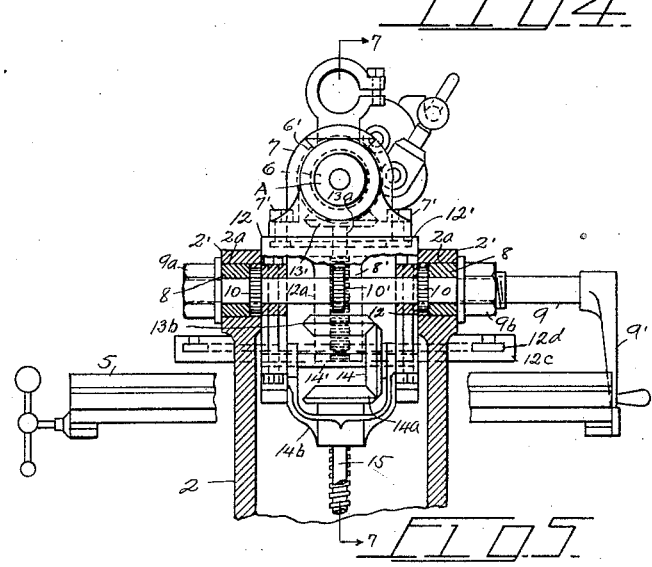

Figure 1 is a front elevation of the complete machine, the spindle head being disposed normally. Fig. 2 is a vertical longitudinal section, taken substantially on line 2—2 of Fig. 1. Fig. 3 is a similar section, showing the spindle head and related parts tilted and disposed vertically. Fig. 4 is a transverse vertical section, taken on line 4—4 of Fig. 3. Fig. 5 is a broken transverse vertical section, taken on line 5—5 of Fig. 2. Fig. 6 is a broken front elevation, taken in the direction of the arrow in Fig. 3. And Fig. 7 is a vertical longitudinal section, taken substantially on line 7—7 of Fig. 5.

In the drawings, 2 represents the base upon and within which are supported all of the working and other parts of my milling machine. 3 represents a knee, which is slidable on ways 3′, and may be raised and lowered by a screw 3ª. The top of the knee is provided with ways 3′, by which the usual saddle 4 is adjustably supported, the saddle being movable by a screw 4′. 5 is the ordinary oblong work table, which is adjustably supported by the saddle. The foregoing parts are all well-known, and may follow any of the usual constructions.

The milling tool A is supported and driven by a spindle 6, the latter being operable in and guided by a head 7, which is movably mounted above the base 2. The top of the base 2 is preferably open, and has lateral side portions 2′, which are formed with registering horizontal rectangular openings or slots 2ª, in which similar guide-blocks 8 are slidably disposed. The guide-blocks 8 are preferably substantially square in side elevation, and are of considerably smaller area than the slots, so as to enable the blocks to be moved horizontally in the slots, for correspondingly adjusting the head 7 bodily towards and away from the table 5. The blocks 8 are bored out centrally to receive and operatively support a transversely disposed shaft 9, which is manually operable by a crank 9′. The top margins of the slots 2ª are fitted with toothed racks 2ᵇ, which are adapted to be engaged by pinions 10 that are rigid to the shaft 9, and by means of which the head 7 may be moved horizontally, at certain times, when the shaft 9 is rotated in either direction. The shaft 9 is fitted with nuts 9ª—9ᵇ, which engage threaded portions of the shaft, the nut 9ᵇ preferably being employed for tightening the shaft and preventing accidental movement of the head and related parts in any direction by means of said slots during the milling operations. The head 7 is preferably mounted directly upon a depending hollow member 12, which is slidable vertically between the side portions 2′ of the frame, the head being rotatable on the part 12 by means of a circular guide-groove 12′, in which bolts 7′ play (see Figs. 1, 5, 6 and 7). The lateral sides of the member 12 extend below the slots 2ª and are formed with vertical rectangular slots or openings 12ª, in which is slidably disposed similar guide blocks or bearings 8′ carried by the shaft 9 intermediate the blocks 8. The forward margin of the slot 12ª is fitted with a rack 12ᵇ (see Figs. 1, 5 and 7), which is engaged by a pinion 10′, also carried by shaft 9, by means of which the head and member 12 may be raised and lowered bodily relatively to the frame 2 and the table 5 by the rotation of said shaft. The lower end of member 12 is provided with a semi-circular guide 12ᶜ, which is formed with a groove 12ᵈ, in which a bolt 12ᵉ, carried by a depending portion 7ˣ of the head 7 plays. The guide 12ᶜ cooperates with and supplements the guide 12' for properly supporting the head when the latter is rotated on the normal driving axis 13, which is concentric to both of the circular guides and intersects the longitudinal axis of the spindle 6.

The spindle 6 supports a bevel gear 6', driven by a similar gear 13', which is mounted upon an upright shaft 13$^a$, whose lower end supports a gear 13$^b$ which meshes and is driven by a gear 14 mounted upon a transverse shaft 14', the latter being journaled in the opposite sides of the member 12. The gear 14 is driven by a gear 14$^a$, which is mounted upon the upper end of a shaft 15. The gear 14$^a$ is directly supported by a yoke 14$^b$, which pivots on the shaft 14'. By this construction and arrangement, the yoke 14$^b$ may rotate or assume different positions, as may be understood by comparing Figs. 2, 3 and 4. The lower portion of shaft 15 slidably telescopes a hollow shaft 16, whose lower end supports a bevel gear 16', the latter being driven alternately by similar gears 16$^a$—16$^b$, carried by the main shaft 16$^c$ that extends beyond the base and is fitted with the usual speed-changing pulleys 16$^d$. 16$^e$ represents a belt that transmits power to shaft 16$^c$ and related parts. The gears 16$^a$—16$^b$ are preferably connected and slidable on shaft 16$^c$, and are shiftable into and out of mesh with gear 16', by means of a clutch 17, which is operable by a lever 17', for changing the direction of rotation of the spindle and tool, in a well-known manner. The spindle 6 is adjustable endwise in the head 7 by means of threads 6$^a$, which engage a split threaded hub 7$^a$ at the rear of the head, the said hub being clamped to the spindle by a screw or bolt 6$^b$. In order to permit the endwise movement of the spindle without disturbing the gear 6', the latter is provided with splines $x$, which play in grooves or ways formed in the opposite sides of shaft 6 (see Fig. 7). The member 12 is rotatable or tiltable towards and away from the table 5, in a vertical plane on the shaft 9 (compare Figs. 2 and 3), by a mechanism which will now be described:

The semi-circular guide 12$^c$ is formed with or supports a depending perforated ear 18, which is pivoted by a pin 18', between similar lugs 19' of an elevating member 19, which normally extends to a point near the bottom of the base 2, as best seen in Fig. 2. The member 19 is provided near its top and also near its bottom end with similar forwardly facing arms 19$^a$—19$^b$, between which extends a screw 20, which is preferably rigid to said member. The screw 20 passes loosely and axially through a bevel gear 21 and its hub 21', to which is rigidly secured a nut 22 that engages and traverses the screw 20. The rotation of the gear 21 in opposite directions raises and lowers the member 19, and correspondingly tilts the head 7 and member 12, as from the position shown in Fig. 2, to that shown in Figs. 3 and 6, and vice versa. The gear 21 is supported by a yoke 23, the latter being pivoted on alining pins 24—24' which are supported by the opposite sides 2 of the frame. The pin 24 is preferably bored out to receive and journal a shaft 25, upon whose inner end is rigidly mounted a bevel gear 25', which meshes and drives the gear 21. The outer end of shaft 25 is fitted with a crank 26, by which the tilting or elevating mechanism may be operated manually.

By consulting Figs. 2 and 3, it will be understood that the head and member 12 may be tilted upwardly and forwardly on the axis 9, to the extent of 90°, and obviously these parts may be disposed at any lesser angle between the extremes, shown in said views. When the head is positioned vertically, as in Fig. 3, the slots 2$^a$ and 12$^a$ are brought into registry horizontally, and in order to suitably position the tool A relatively to the table 5, the blocks 8—8' may be moved in either direction horizontally in the said slots. When the head 7 is tilted as in Figs. 3 and 6 the said parts may be swung towards the right or the left on the guides 12' and 12$^c$, for milling or boring at different angles, as shown by dotted lines in Fig. 6. The head may be rigidly secured in any of the adjusted positions by the tightening of the bolts 7' and 12$^e$ and the nut 9$^b$. During the upward and downward tilting of the head and member 12, as well as the bodily movements of the said parts by reason of the openings 2$^a$—12$^a$, the shaft 15 reciprocates in the sleeve 16. By this arrangement, the driving connections between the main shaft 16$^c$ and the spindle 6 remain unbroken, and need no attention or care, except to change the speed and the direction of rotation of the spindle and tool, as explained. When the head is tilted from the position shown in Fig. 2, the gear 13$^b$ traverses the gear 14, and when the head is swung laterally on the guides 12'—12$^c$ as shown in Fig. 6, the gear 6' traverses the gear 13', in a well-known manner. The gear 14$^a$, as well as gear 16' and gear 21 become respectively shifted relatively to the gears 14, 16$^a$—16$^b$ and 25', during the tilting operations of the head and member 12, as may be understood by comparing Figs. 2 and 3.

My invention is extremely simple and may be produced at less cost than the ordinary universal milling devices. The provision of the support 12, which is pivoted to the base and supports the spindle head; the tilting mechanism by which the head and its support may be swung upwardly and forwardly substantially 90°; the means for rotating the head on its support substantially 180°, whether or not the parts are in their normal or tilted positions, together with the novel arrangement of the driving means, enables me to perform many machining operations that cannot be performed by the ordinary milling machines, except by the employment of a large number of extra attachments. The elimination of these special attachments alone greatly simplifies the operation of my machine, and effects a material saving of time, labor and expense.

Having thus described my invention, what I claim, is—

1. In a milling machine, a base, a head having a tool-carrying spindle, means to pivot the head to the base for vertical movement, bodily-shiftable elevating means for the head, and rotatable means for bodily shifting the elevating means.

2. A milling machine including a hollow base, a work table, a tool spindle, a movable head for supporting the spindle above the base, a support for the head pivoted within the base, means within the base for tilting the support and the head towards and from the work table, means for rotating the head on said support whether or not said parts are tilted, means for driving the spindle, and means for reversing the rotary movement of the spindle.

3. In a milling machine, the combination with a hollow base, a work table, and a tool spindle, of a head for supporting the spindle, a movable support for the head pivoted to the base, the head being rotatable on said support, a mechanism for driving the spindle including an extensible shaft, an elevating mechanism comprising a worm pivoted to said support and manually operable gears adapted to tilt the head and its support on said pivot.

4. A milling machine including a base, a hollow member pivoted in the base having circular guide grooves, a spindle rotatably mounted on said member by means of said grooves, a driving mechanism including an extensible shaft and a plurality of gears for driving the spindle, means for moving said member bodily horizontally and vertically in the base, and means for tilting said member on its pivot for disposing the spindle at different angles relatively to the work.

5. A milling machine including a hollow base, a work table, and a tool spindle, a movable head supporting the spindle above the base, means pivoted within the base for supporting the head, means for moving the head and its support bodily horizontally and vertically, means for tilting the head and its support in a vertical plane on said pivot, a plurality of gears and a shaft for driving the spindle, said shaft adapted to extend by the tilting of the head for preventing interruption of the driving during the tilting operations.

6. In a milling machine, the combination with a base, a work-table, and a tool spindle, of a head for adjustably supporting the spindle, a member on the base, swivel means for connecting the head and said member, means for pivoting said member to the base, a driving mechanism including an extensible shaft adapted to drive the spindle in all of its adjusted positions, means for tilting the head and said member forwardly in a vertical plane, and means for moving said member horizontally relatively to the table.

7. A milling machine including a hollow base and a work table supported thereby, a spindle head disposed above the base, a member pivoted within the base for supporting the head, concentric guides for rotating the head on said support, means for moving the head and said member bodily horizontally and vertically on said pivot, a worm and a gear adapted for tilting said member and the head in a vertical plane towards and away from the table on the said pivot, and a driving mechanism including an extensible shaft and a plurality of gears adapted for continuously driving the spindle in all of its adjusted positions.

8. A milling machine including a hollow base, a work table and a tool-spindle, a head for adjustably supporting the spindle, a member for supporting the head above the base and table, means for rotating the head on said member, means for driving the spindle, means for maintaining the driving connections unbroken while the head is being moved, a shaft for pivoting said member to the forward portion of the base adapted to raise and lower the head and its support and also to move said parts horizontally bodily, a tilting mechanism comprising a screw engaging said member rearwardly of said shaft, and a pair of gears adapted for swinging said member and the head upwardly and forwardly on the axis of said shaft.

9. In a milling machine, the combination with a hollow frame, a work table, and a tool spindle swingable in opposite directions in horizontal, vertical and oblique planes relatively to the table, a head for adjustably supporting the spindle, a member for supporting the head above the frame, a shaft for pivoting the member to the frame, guide blocks carried by the frame and said member for operatively supporting the shaft, means for moving said guide blocks vertically as well as horizontally for shifting the head and said member bodily relatively to the table, means for tilting the head and said member around the axis of said shaft, means for rotating the head independently of said member, and means for driving the spindle without interruption by the tilting, rotating or bodily moving of the head and said member.

10. In a milling machine, an upright base, a member on the base, said base and said member having coinciding guide openings located near the forward side of the base, a shaft extending through said openings comprising the axis upon which said member may be tilted in a vertical plane, guide blocks for supporting said shaft slidable in said openings adapted for moving said member bodily horizontally and vertically relatively to the base, a head mounted upon and swiveled to said member adapted to rotate substantially 180°, a tool spindle carried by said head, means for driving said spindle when the head is in the normal as well as the tilted positions, and means engaging the rear-portion of said member adapted for tilting said member and the head from the horizontal to the vertical position on the said axis.

11. A milling machine comprising an upright base, a work table carried by the base, a member on the base, said base and said member having coinciding guide openings, a shaft extending through said openings and pivoting the member to the base, block-bearings for said shaft slidable in said openings for enabling said member to be moved bodily horizontally and vertically relatively to the table, a head swiveled to said member and rotatable in a plane parallel to the axis of said shaft, a tool spindle carried by said head, means for driving said spindle one member of said means being extensible, and a mechanism comprising a screw pivoted to said hollow member, a pair of gears, and a nut arranged to traverse said screw adapted for tilting the head vertically around the axis of said shaft.

12. In a milling machine, a base, a member pivoted on the base, a head, a tool-carrying spindle on the head, means to mount the head for movement on the member to dispose the spindle at varying inclinations to the work, means to effect horizontal and vertical adjustments of the member, means to tilt the member about its pivot, and means to effect constant driving of the spindle in all movements of the member and head.

13. In a milling machine, a base, a head, a tool-carrying spindle on the head, means pivoted to the base for supporting the head, means to effect vertical and horizontal adjustments of said supporting means and therewith the head, means to move the supporting means about its pivot thereby to tilt the head, and means to effect constant driving of the spindle in all movements of the supporting means.

14. In a milling machine, a base, a head, a tool-carrying spindle on the head, means pivoted to the base for supporting the head, means to effect adjustment of the supporting means relative to the work, means pivoted to the member and depending therefrom to move the supporting means about its pivot thereby to tilt the head, and means to effect constant driving of the spindle in all movements of the supporting means.

15. In a milling machine, a base, a head having a tool-carrying spindle, means to pivot the head to the base for vertical movement, means pivoted to said first named means and spaced from the pivotal point of said first means to elevate the head, means to actuate the second named means, and means to constantly drive the spindle in any position of the head.

16. In a milling machine, a base, a head having a tool-carrying spindle, means to pivot the head to the base for vertical movement, operating means carried by the base, means depending from the head and connected to the operating means and actuated thereby for elevating the head, and means to constantly drive the spindle in any position of the head.

17. In a milling machine, a base, a head having a tool-carrying spindle, means to pivot the head to the base for vertical movement, elevating means for the head depending therefrom, and means carried by the base to actuate the elevating means and to automatically hold the head upon cessation of movement of the actuating means.

In testimony whereof I affix my signature.

OLIVER W. CURTIS.